(12) United States Patent
Stervik et al.

(10) Patent No.: US 8,701,807 B2
(45) Date of Patent: Apr. 22, 2014

(54) TRANSMISSION CONTROL SYSTEM IN VEHICLES

(75) Inventors: Hans Stervik, Kärma (SE); Jan Öberg, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 518 days.

(21) Appl. No.: 13/058,207

(22) PCT Filed: Aug. 29, 2008

(86) PCT No.: PCT/SE2008/000488
§ 371 (c)(1), (2), (4) Date: Feb. 9, 2011

(87) PCT Pub. No.: WO2010/024737
PCT Pub. Date: Mar. 4, 2010

(65) Prior Publication Data
US 2011/0137505 A1 Jun. 9, 2011

(51) Int. Cl.
*B60K 7/00* (2006.01)
(52) U.S. Cl.
USPC ........... 180/65.6; 701/54; 701/58; 180/65.21; 180/65.22; 180/65.235; 180/65.8
(58) Field of Classification Search
None
See application file for complete search history.

(56) References Cited

U.S. PATENT DOCUMENTS

| | | | | |
|---|---|---|---|---|
| 5,318,142 A | * | 6/1994 | Bates et al. | 180/65.245 |
| 5,586,613 A | * | 12/1996 | Ehsani | 180/65.23 |
| 5,637,987 A | * | 6/1997 | Fattic et al. | 322/40 |
| 5,841,201 A | * | 11/1998 | Tabata et al. | 290/40 C |
| 6,464,026 B1 | * | 10/2002 | Horsley et al. | 180/65.25 |
| 6,887,180 B2 | * | 5/2005 | Pels et al. | 477/3 |
| 7,021,409 B2 | * | 4/2006 | Tamor | 180/65.25 |
| 7,089,095 B2 | * | 8/2006 | Takami et al. | 701/22 |
| 7,381,146 B2 | * | 6/2008 | Gouda et al. | 477/3 |

(Continued)

FOREIGN PATENT DOCUMENTS

| | | |
|---|---|---|
| EP | 1852635 A1 | 11/2007 |
| GB | 2359865 A | 9/2001 |
| WO | 0208574 A1 | 2/2002 |

OTHER PUBLICATIONS

International Search Report for corresponding International Application PCT/SE2008/000488.

*Primary Examiner* — Thomas Tarcza
*Assistant Examiner* — Richard Goldman
(74) *Attorney, Agent, or Firm* — WRB-IP LLP

(57) ABSTRACT

An Electronic Control Unit (ECU), and a method and a computer program product are provided for the control of a drive train for a hybrid vehicle, and a drive train including such a control device is also provided. The hybrid vehicle includes an upstream located Internal Combustion Engine (ICE) which is connected to an Electronic Motor/Generator (EMG) via a Master Clutch (MC). The EMG is connected to the wheels via a Mechanical Transmission (MT) including synchronization. The ECU is programmed to control the MC and the MT when shifting from a generating mode, in which the ICE is powering the EMG at or near standstill, to a driving mode in such a way that at least a part of the inertial energy liberated when retarding the EMG in order to synchronize the rotational speed of the EMG and the MT is transferred to the wheels by using the synchronization in the MT to retard the EMG and transfer of power to the wheels.

7 Claims, 3 Drawing Sheets

(56) References Cited

U.S. PATENT DOCUMENTS

| | | | |
|---|---|---|---|
| 7,877,184 B2* | 1/2011 | Watanabe et al. | 701/54 |
| 8,475,330 B2* | 7/2013 | Kaltenbach et al. | 477/5 |
| 8,475,331 B2* | 7/2013 | Kaltenbach et al. | 477/5 |
| 2001/0029220 A1* | 10/2001 | Kato | 477/5 |
| 2002/0073802 A1* | 6/2002 | Sakamoto et al. | 74/665 A |
| 2003/0006076 A1* | 1/2003 | Tamor | 180/65.2 |
| 2003/0173123 A1* | 9/2003 | Nakanowatari | 180/65.2 |
| 2006/0199696 A1* | 9/2006 | Gouda et al. | 477/3 |
| 2006/0293144 A1* | 12/2006 | Nishina et al. | 477/5 |
| 2007/0095584 A1* | 5/2007 | Roske et al. | 180/65.2 |

* cited by examiner

TRANSMISSION CONTROL SYSTEM IN VEHICLES

BACKGROUND AND SUMMARY

The present invention relates to an Electronical Control Unit (ECU) for a drive train system in a vehicle, a drive train system comprising such an ECU, the control of such a drive train system, a computer program product and a storage medium, such as a computer memory to be implemented in the ECU. In particular, the invention relates, in an aspect thereof, to the control of drive train systems of hybrid vehicles comprising an Internal Combustion Engine (ICE) and an Electrical Motor/Generator (EMG).

Because of the desire to manufacture vehicles with less impact on the environment when driving, e.g. lower fuel consumption and less noxious exhaust gases, there has been an increased interest in hybrid vehicles having a propulsion system comprising an Internal Combustion Engine (ICE) as well as an Electric Motor/Generator (EMG). The ICE and the EMG work in a complementary way such that the electric motor preferably is used in low speed conditions where there are frequent start and stops, e.g. in a city environment, while the ICE for example is preferably used when driving at relatively constant high speeds, e.g. on a high way.

One problem associated with the kind of propulsion system described above is that the complete system occupies more space than ordinary propulsion systems such as an ordinary vehicle only having an ICE or a purely electric vehicle. In addition to provide the vehicle with two propulsion units there is also a need of providing the vehicle with a system and devices for controlling the propulsion units and the drive train system in an efficient way which implies that further details are to be added to the vehicle. Hence, the arrangement of the drive train units in a hybrid vehicle is thus more space demanding and requires a more advanced control system in order to be able to take advantage of the benefits of having two separate propulsion units.

However, the hybrid vehicle will have certain benefits over both the vehicles mentioned above. The purely electric driven vehicle is not in general able to travel as long distances as an ordinary ICE driven vehicle due to limits of the maximum stored energy and the electric motor is usually not as strong as the ICE with slower accelerations and worse performance when a large torque is required, e.g. when starting and driving a heavy loaded vehicle, in steep uphills or when a fast acceleration is desired, for example at overtaking. The hybrid vehicle will thus not have these disadvantages since it may use the ICE when desired. Furthermore, the hybrid will have similar advantages as the electrical vehicle when there is a desire to drive the vehicle with low emissions and the hybrid vehicle may be driven by the electric motor under for example repetitive start and stop conditions or in a city environment where it is particularly desirable to lower the noxious emissions such as nitrogen oxides, carbon oxides or particles. Hence, the hybrid vehicle will have the benefit of lower fossil fuel consumption than ordinary vehicles using combustion engines and have a wider operating range and better driving characteristics, e.g. acceleration and power, than electric vehicles of today. Due to the above stated benign effects of using two propulsion units and an overall great potential in the future for hybrid vehicles, there is a desire to develop hybrid vehicles in spite of the more advanced and costly drive train system.

A number of different drive train systems and drive train control systems are described in for example U.S. Pat. No. 5,637,987; U.S. Pat. No. 6,887,180; U.S. Pat. No. 7,089,095; or GB 2 359 865. These systems thus provide different solutions about how to control a hybrid drive train system. However, the above described systems are rather complicated and it is a general desire when designing a hybrid drive train system and control features thereof to provide a compact system in order to avoid an unnecessary bulky and heavy construction.

A proposed solution to the problem of providing a compact system for a hybrid vehicle which at the same time is relatively simple in its set up is for example described in US 2007/0095584 wherein a hybrid drive mechanism having a single clutch is described. The system comprises an Internal Combustion Engine (ICE) having a drive shaft coupled to the shaft of an electric machine, i.e. an Electric Motor/Generator (EMG), via a clutch. The EMG is further connected to an input shaft of a mechanical transmission which in turn is connected via its output shaft to a differential transmission which distributes the driving force to the wheels on each side of the driven axle. However, one possible problem with such a compact system may be to manage to control the drive train system with a desired accuracy.

Hence, an important feature of the hybrid system is the control of the propulsion units and the drive train system so as to be able to benefit from the advantages of the two propulsion units. One major problem to deal with concerns the energy storage capacity of the electric motor and the regeneration of electricity. There is an almost constant need to generate electrical energy and store it in a battery or the like energy storage device since the capacity of the battery generally is rather limited. It is thus desirable to be able to manage the propulsion units in an efficient way such that the engine respectively the motor/generator may be used in an optimal way and that they are controlled in dependence of the State OF Charge (SOC) of the battery or energy storage device.

In addition to control the drive train system with such concerns as fuel efficiency, exhaust gas pollutions, e.g. carbon dioxide and NOx, and control the State Of Charge (SOC) of the battery, it is also desirable to keep the driving parameters such as acceleration properties, engine response to control actions and smoothness in gear shifting etc. at the same level as for ordinary vehicles, i.e. vehicles provided with only a ICE. Hence, there is a need of a new and improved control strategy in order to satisfy the demands for good drivability, energy efficient driving, control of the SOC of the battery and managing these desired properties while using a compact hybrid drive train system.

The invention relates, according to an aspect thereof, to a drive train system for a hybrid vehicle comprising an Internal Combustion Engine (ICE) located upstream in the drive train system of an Electric Motor/Generator (EMG). The ICE may be of any desired type, e.g. an Otto-engine or diesel-engine. The EMG may also be of any desired kind but should have the ability of working as an electric motor as well as a generator. The ICE is connected to the EMG via a Main Clutch (MC). The arrangement may thus be exemplified by an output shaft of the ICE connected to an input shaft of the EMG via a MC. The MC may be a friction clutch, such as a disc clutch, or a positive engaging clutch, e.g. a dog clutch. In general, a positive engaging clutch is desired in this position since a positive engaging clutch generally contributes with less energy losses than a friction clutch. The drive train system further comprises a mechanical transmission provided with at least one synchronized gear. The mechanical transmission is located downstream of said EMG and upstream of end actuators (wheels). In this context, the mechanical transmission is considered to involve any stepped gear selection device or transmissions which are able to change a speed ratio of an incoming shaft and an outgoing shaft. The transmission may for example be only a main gearbox or a main gearbox with one or several auxiliary gearboxes such as a split and/or range gear shift arrangements as described in EP 1 852 635. The drive train system is further connected to an Electronic Control Unit (ECU) for control of the drive train system. The drive train system according to an aspect of the invention is thus an automatic or semiautomatic system which receives control signals from the ECU. The invention is characterised, according to an aspect thereof, in that the ECU is programmed to perform a control sequence comprising the steps of:

a) Setting the drive train system in a generating mode when the vehicle is at standstill with its ICE running and there is a signal indicating that electric generation is desired. An indication of desired energy generation may for example be the State Of Charge (SOC) of the battery, an indicator of time at standstill conditions or a manually triggered signal indicating that electricity generation is desired. This standstill or idle generating mode includes the features of setting the MC to be engaged such that the EMG is rotating in a generating mode and the end actuators are decoupled by the use of a synchronized gear of the mechanical transmission set in neutral mode. The ICE and EMG are preferably controlled such that the ICE is working in an optimal manner concerning such aspects as (fuel) efficiency and low concentrations of noxious components in the exhaust gases while the rotational speed of the EMG preferably is optimised concerning an efficient generation of electricity. This is usually achieved by controlling the rpm of the ICE and the load on the EMG. Even though it would be possible to incorporate some kind of gear or transmission arrangement between the output shaft of the ICE and the input shaft of the EMG, in order to set the rotational speed of the input shaft for optimal generation of electricity at the desired idling speed of the ICE at regeneration, the gear ratio between the output shaft of the ICE and the input shaft of the EMG is usually 1:1, e.g. by using a positive engaging clutch such as a dog clutch, in order to avoid friction losses while keeping the system compact and simple.

b) Starting the change of mode from idle to driving as a response to an input signal to the ECU indicating that a motion of the vehicle is desired. This signal may for example be triggered by a gear change from neutral to forward or rear, pressing down of the accelerator pedal or release of a service brake/parking brake or any other suitable indication of a status or change of status of a relevant parameter.

c) Disengage the MC such that the ICE and EMG are disengaged from each other. By disengaging the ICE from the EMG, the rotational speed of the EMG may be decreased rather quickly. Furthermore, the synchronization arrangement of the above mentioned synchronized gear, which was used to decouple the end actuator (e.g., vehicle wheels) from the EMG and ICE, is engaged. By engaging the synchronization arrangement of the gear, which earlier was set in neutral mode, it will be possible to transmit a torque to the end actuators from for example the inertial forces while retarding the rotational speed of the EMG. An advantageous feature by using this control method is that there will be a faster response of the start up of the vehicle in response to a signal indicating that a motion of the vehicle is desired. As described in the control method in US 2007/0095584, there is a waiting time from the point of time it is indicated that a change from a generative, still standing mode to moving of the vehicle is desired due to the waiting for the slow down of the EMG to zero or close to zero before the gear is shifted from neutral to a selected gear. This waiting time may be annoying for the driver who is used to feel a response directly to his control actions. Hence, the present control method will make the vehicle start to move more quickly as a response to an appropriate input signal indicating a motion of the vehicle is desired. Hence the synchronization procedure and the synchronized gear will be used in order to transmit a torque from the EMG, (preferably via inertial forces of the EMG and associated shafts), to the end actuators, e.g. wheels in the case of an ordinary car, truck or bus. In addition to be able to use the energy stored as inertia forces in the system to provide an immediate response to the desire to move, it will also have the benefit of using mechanical energy directly without the need of converting it to electrical energy before it is reconverted to mechanical energy or, still worse, brake the rotation of the EMG by the use of a friction brake or the like device such that the inertial energy is lost as friction. The overall energy efficiency may thus be improved by the use of the control strategy herein described. Still another advantage is that the retardation of the rotational speed of the EMG while setting the vehicle in motion by the use of the synchronization arrangement will also contribute to a smooth start of the vehicle. Hence, the EMG will retard due to the braking force of the synchronization of the mechanical transmission and at least a part of the inertial energy of the EMG will be transferred to the end actuators and the vehicle will smoothly start to move.

d) When the EMG has slowed down enough such that the rotational speed is within the speed limit to engage the positive coupling of the synchronized gear, the EMG and the end actuators will be connected by the positive coupling of the synchronized gear. Hence, the EMG may now start to work as a motor and be the power source of the vehicle during start and acceleration of the vehicle.

The above described drive train system may of course work for a variety of hybrid vehicles and is for example suitable for a vehicle provided with such a system as described in US 2007/0095584. However, it most advantageous use may be for vehicles which have frequent starts and stops, e.g. local buses, mail van or a refuse lorry.

The invention, in an aspect thereof, also relates to a method for the control of a drive train system of a vehicle. The drive train system comprises an Internal Combustion Engine (ICE) located upstream in the drive train system of an Electric Motor/Generator (EMG). The ICE is connected to the EMG via a Main Clutch (MC). The drive train system further comprises a mechanical transmission (MT) provided with at least one synchronized gear. The mechanical transmission is located downstream of the EMG and upstream of end actuators, e.g. wheels. The drive train system is further connected to an Electronic Control Unit (ECU) for control of the drive train system. The method for control of the drive train system comprises the steps of:

a) Setting the drive train system in a generating mode when the vehicle is at standstill or idle with its ICE running while the MC is engaged such that the EMG is rotating in a generating mode and the end actuators are decoupled by the use of a synchronized gear set in neutral mode.

b) Preparing a control sequence for the change of driving mode from idle to driving as a response to a signal in the ECU indicating that a motion of the vehicle is desired. The signal indicating that a motion of the vehicle is desired may be received as such a signal by the ECU or computed by the ECU from sensed conditions in the drive train system and/or parameters relevant to the driving conditions and the condition of the vehicle in general.

c) Disengaging the MC such that the ICE and EMG are disengaged from each other and engaging the synchronization arrangement of the above mentioned synchronized gear, which were used to decouple the end actuator from the EMG and ICE, in order to transmit a torque from the rotating EMG and associated axles to the end actuators while the EMG is slowing down. Preferably, the MC is disengaged before the synchronization arrangement of the gear is engaged in order to avoid wear of the MC and/or the synchronization arrangement. However, these operations may slightly overlap if the MC and synchronization arrangement are dimensioned for such a control strategy and it is desired to speed up the procedure and make the change occur more rapidly.

d) Engage the positive coupling of the synchronized gear when the rotational speed of the EMG and the shaft connected to the end actuators are within the engaging speed limits. When this step is finished it is of course possible to once again allow the vehicle to be powered by the ICE, provided that the rotational speed of the EMG is within the range where the ICE may be connected to the EMG, by connecting the output shaft of the ICE to the input shaft of the EMG by engaging the Master Clutch. In order to control the acceleration of the vehicle, it is important to select the gear such that a desired gear ratio is achieved. Generally, a low gear, or in most cases, the lowest gear, is to be selected when starting to move the vehicle from a still standing, generating mode. The selection of an appropriate gear at start up follows in general essentially the same gear shift pattern as used for a hybrid starting up with its EMG as the power source or the limits for the gear shift pattern may be slightly amended to shift up to start at a higher gear due to the additional starting force from the inertial energy from the EMG.

Still another feature which is important for the acceleration force is the pressure by which the shift fork is pressed against the synchronization cone. On one hand, there is of course a desire to use a high pressure in order to achieve a fast response to start the moving of the vehicle. On the other hand, the fork pressure in the synchronization arrangement should not be too high to avoid a jerky or abrupt start which may be inconvenient for drivers or passengers and such an abrupt start may also cause wear of the drive train system due to large reaction forces when starting. In addition, the wear of the synchronization arrangement and the surfaces of the cones should be considered such that the synchronization arrangement is not worn out too fast. It may of course be possible to use different synchronization arrangements if there are several synchronization arrangements available in the mechanical transmission in order to not wear out one, single synchronization arrangement too fast.

BRIEF DESCRIPTION OF DRAWINGS

The features and advantages of the present invention are well understood by reading the following detailed description in conjunction with the drawings in which like numerals indicate similar elements and in which.

DETAILED DESCRIPTION

Figure 1:
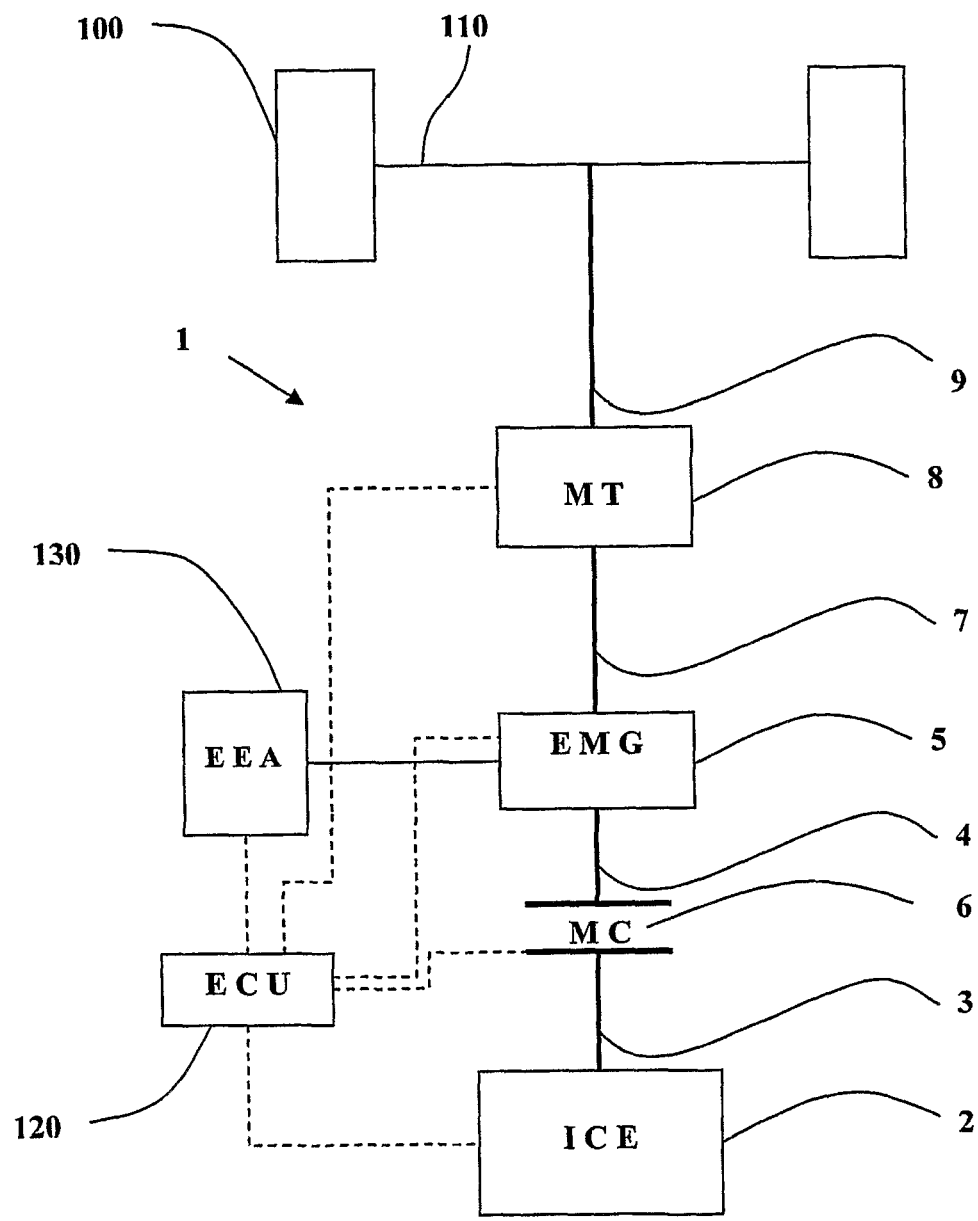
FIG. 1 is a schematic view of a vehicle with a drive train system according to an aspect of the present invention.

A vehicle comprising a drive train system 1 according to an aspect of the invention is shown in FIG. 1. The system comprises an Internal Combustion Engine (ICE) 2 provided with an output shaft 3 connected to an input shaft 4 of an Electric Motor/Generator (EMG) 5. The output shaft 3 and the input shaft 4 are connected via a Main Clutch (or Master Clutch) (MC) 6. The EMG 5 is further provided with an output shaft 7 connected to a Mechanical Transmission (MT) 8. The MT 8 is further provided with an output shaft 9 which is connected to the driving wheels 100 of the vehicle via a driven axle 110. The system is controlled by an Electronic Control Unit (ECU) 120 which is connected to the ICE 2, the EMG 5, the MC 6 and the MT 8. The EMG 5 is also connected to an Electric Energy Accumulator (EEA) 130 which may be generated with electrical energy when the EMG 5 is used as a generator and is used as the energy source for the EMG 5 when it is used as a motor.

According to an aspect of the invention, the ECU 120 is programmed to perform a specific control sequence which is to be used for changing between a driving situation of the hybrid vehicle and a regenerative idling mode. The ECU 120 may be programmed to recognize certain conditions concerning the state of the system, e.g. State of Charge (SOC) of the EEA 130, or driving conditions, e.g. a lot of short start and stop maneuvers, or to receive other control signals, e.g. manually pressing a button, indicating that a generation is desired. As stated above, the proposed generation strategy is directed to generation of electricity at a standstill or idling condition. As the function is described, it is preferably some sensor provided indicating that the vehicle is at standstill (or close to standstill) or idle before starting the control sequence for generation of electricity.

However, when it is decided by the ECU 120 that an idling generation shall be performed, the ECU controls the MC 6 to be engaged such that the EMG 5 is rotating in a generating mode and the end actuators, i.e. the wheels 100, are decoupled by the use of the MT 8 which is set in neutral mode. Any gear in the MT 8 may be set in neutral mode such that there is no torque transmitted to the wheels 100. However, in order to be able to use the advantages of the control strategy, the gear which is shifted from neutral mode to be engaged in order to end the generation mode and start a driving mode of the vehicle must be a synchronized gear. The change from this standstill or idling, generative mode to a driving mode is made as a response to an input signal or a computed control command from input signals to the ECU 120 corresponding to the state of parameters of the drive train system 1 or the EEA 130 for example. When it is decided that it is desired to start to move the vehicle, the ICE 2 and EMG 5 are decoupled by disconnecting the MC 6. When the ICE 2 and EMG 5 are decoupled, the synchronized gear in the MT 8, which has been used to decouple the wheels 100 from the EMG 5 (and ICE 2), starts to engage the synchronization arrangement of the above mentioned synchronized gear in order to transmit a torque from the EMG and associated shafts, e.g. inertial forces in the system, to the end actuators. In an alternative control strategy, the disengagement of the Master Clutch 6 and the engagement of the synchronization arrangement may overlap such that the synchronization arrangement starts to work before the MC 6 is disengaged, or in case of a continuously variable clutch such as a disc clutch, before the clutch is completely disengaged. At this stage, preferably no power is supplied to the EMG 5 and preferably the generation of electricity also is turned off such that the EMG 5 will slow down due to the synchronized engagement with the mechanical transmission and the wheels such that the vehicle smoothly starts to move. When the rotating speed of the shaft of the synchronized gear connected to the EMG 5 side is close to the rotating speed of the synchronized gear connected to the wheel 100 side and the rotational speeds of the two sides of the synchronized gear are within a desired interval, the positive coupling of the synchronized gear will be engaged.

Figure 2:
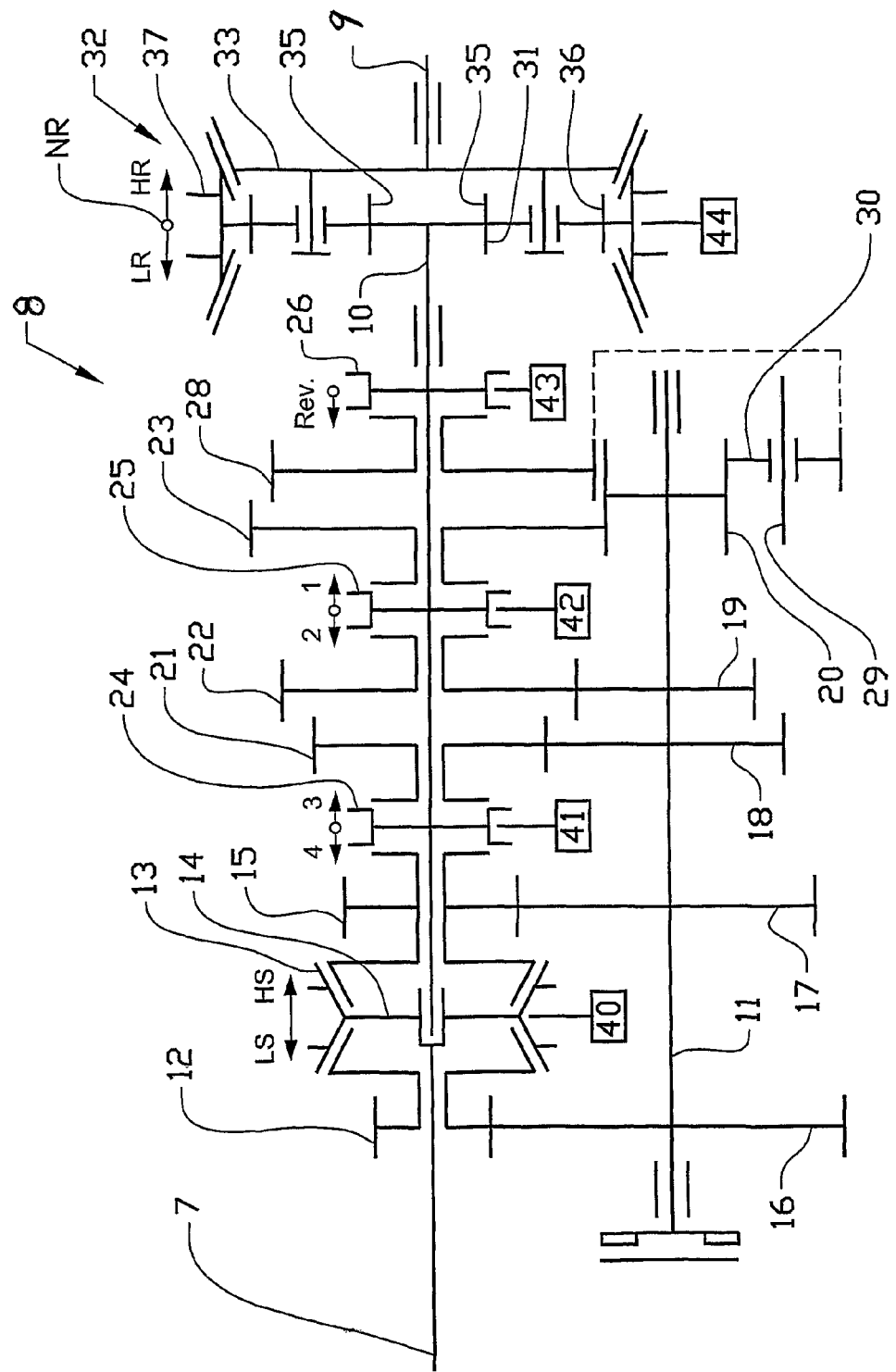
FIG. 2 is a schematic view of a transmission according to an aspect of the present invention.

In FIG. 2 is shown a Mechanical Transmission (MT) 8 suitable for the present invention. A gear wheel 12 is mounted rotatably on the input shaft 7, i.e. the output shaft 7 from the EMG in FIG. 1, and is lockable on the shaft by means of an engaging sleeve 13 which is provided with synchronizing means and is mounted non-rotatably but axially displaceably on a hub 14 connected non-rotatably to the input shaft 7. By means of the engaging sleeve 13, a gear wheel 15 mounted rotatably on the main shaft 10 is also lockable relative to the input shaft 7. The gear wheels 12 and 15 engage with gear wheels 16 and 17, respectively, which are connected non-rotatably to the intermediate shaft 11. Arranged in a rotationally fixed manner on the intermediate shaft 11 are further gear wheels 18, 19 and 20 which engage with gear wheels 21, 22 and 23, respectively, which are mounted rotatably on the main shaft 10 and are lockable on the main shaft by means of engaging sleeves 24 and 25, respectively, which, in the illustrative embodiment shown, do not have synchronizing arrangements. However, these sleeves may also be provided with a synchronizing arrangement if desired. A further gear wheel 28 is mounted rotatably on the main shaft 10 and engages with an intermediate gear wheel 30, which is mounted rotatably on a separate shaft 29 and engages in turn the intermediate shaft gear wheel 20. The gear wheel 28 is lockable on its shaft by means of an engaging sleeve 26.

The gear wheel pairs 12, 16 and 15, 17 and also the engaging sleeve 13 form a split gearing with a low gear stage LS and a high gear stage HS. The gear wheel pair 15, 17 also forms, together with the gear wheel pairs 21, 18, 22, 19, 23, 20 and 28, 30, a basic gearbox with four forward gears and one reverse gear. Arranged in a rotationally fixed manner on the output end of the main shaft is a gear wheel 11 which forms the sun gear In a two-stage range gear of the planetary type designated by reference number 32, the planetary gear carrier 33 of which is connected in a rotationally fixed manner to a shaft 34 which forms the output shaft of the gearbox. The planetary gears 35 of the range gear 32 engage with a ring gear 36, which, by means of an engaging sleeve 37, is lockable relative to a gearbox casing for low range LR and relative to the planetary gear carrier 33 for high range HR. The engaging sleeve also has a neutral position NR between the gear positions LR and HR. In the neutral position NR the output shaft 34 is released from the main shaft 10.

The engaging sleeves 13, 24, 25, 26 and 37 are displaceable as shown by the arrows in FIG. 2, to provide the gear stages shown next to the arrows.

The displacement is brought about by servo devices 40, 41, 42, 43 and 44 which are indicated diagrammatically in FIG. 2 and may be pneumatically operated piston/cylinder arrangements of the type used in a gearbox of the type described above. The servo devices are controlled by the electronic control unit 120 (FIG. 1), comprising a microcomputer, depending on signals fed into the control unit representing the various engine and vehicle data such as for example engine speed, vehicle speed, throttle pedal position, engine brake on/off, State Of Charge (SOC) and indicated whether manual shifting or automatic control shifting is desired. The control unit 120 may also control fuel injection, that is to say the engine speed, depending on the throttle pedal position and if the clutch 6 is engaged or disengaged.

The mechanical transmission 8 described in FIG. 2 is only an example of a transmission system suitable for the present invention. The system described in FIG. 2 may be modified for example concerning the number and location of the synchronization arrangements such that the synchronized gear used for the synchronization in the present invention may be located in the main gearbox or in the split gearing arrangement or in the range gear arrangement.

Figure 3:
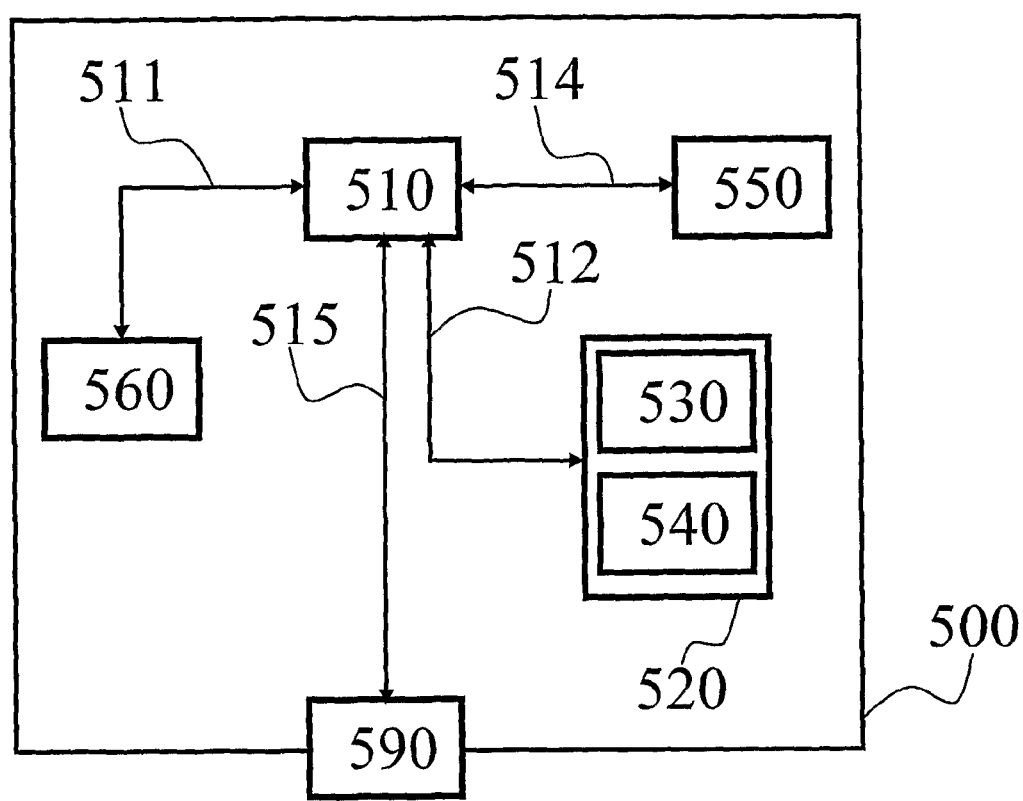
FIG. 3 is a schematic view of an apparatus according to an aspect of the present invention.

The present invention also relates, in an aspect thereof, to a computer program and computer program product, both to be used with a computer for executing said method and FIG. 3 shows an aspect of the invention applied on a computer arrangement.

FIG. 3 shows an apparatus 500 according to one embodiment of an aspect of the invention, comprising a nonvolatile memory 520, a processor 520 and a read and write memory 520. The memory 520 has a first memory part 520, in which a computer program for controlling the apparatus 300 is stored. The computer program in the memory part 520 for controlling the apparatus 520 can be an operating system.

The apparatus 520 can be enclosed in, for example, a control unit, such as the control unit 120. The data-processing unit 510 can comprise, for example, a microcomputer.

The memory 520 also has a second memory part 540, in which a program for controlling the drive train system according to an aspect of the invention is stored. In an alternative embodiment, the program for controlling the drive train system is stored in a separate nonvolatile data storage medium 550, such as, for example, a CD or an exchangeable semiconductor memory. The program can be stored in an executable form or in a compressed state.

When it is stated below that the data-processing unit 510 runs a specific function, it should be clear that the data-processing unit 510 is running a specific part of the program stored in the memory 540 or a specific part of the program stored in the nonvolatile recording medium 550.

The data-processing unit 510 is tailored for communication with the memory 550 through a data bus 514. The data-processing unit 510 is also tailored for communication with the memory 520 through a data bus 512. In addition, the data-processing unit 510 is tailored for communication with the memory 560 through a data bus 511. The data-processing unit 510 is also tailored for communication with a data port 590 by the use of a data bus 515.

The method according to the present invention can be executed by the data-processing unit 510, by the data-processing unit 510 running the program stored in the memory 540 or the program stored in the nonvolatile recording medium 550.

The invention should not be deemed to be limited to the embodiments described above, but rather a number of further variants and modifications are conceivable within the scope of the following patent claims. Hence, the above described logic system is only an example of how to implement the drive train control system into a vehicle and there are several other options obvious to the skilled person in the art of how to implement the invention in a vehicle which are within the scope of the inventive idea in this application.

The invention claimed is:

1. A drive train system for a hybrid vehicle comprising
an Internal Combustion Engine (ICE),
an Electric Motor/Generator (EMG), the ICE being located upstream in the drive train system of the EMG,
a Main Clutch (MC), the ICE being connected to the EMG via the MC,
a mechanical transmission provided with at least one synchronized gear with a positive coupling, the mechanical transmission being located downstream of the EMG and upstream of end actuators,
an Electronic Control Unit (ECU) for control of the drive train system, wherein the ECU is programmed to perform a control sequence comprising:
a) Setting the drive train system in a generating mode when the vehicle is at standstill with its ICE running and a signal is provided to the ECU indicating that electric generation is desired, the generating mode including setting the MC to be engaged so that the EMG rotates in a generating mode and decoupling the end actuators by setting the mechanical transmission in neutral mode by disengaging a synchronization arrangement of the at least one synchronized gear;

b) Preparing a control sequence for a change of driving mode from idle to driving in response to a signal to the ECU indicating that motion of the vehicle is desired;

c) Disengaging the MC so that the ICE and EMG are disengaged from each other and engaging the synchronization arrangement of the at least one synchronized gear, and thereby transmitting a torque from the EMG and associated rotating axles to the end actuators while the EMG slows down due to the engagement with the mechanical transmission and the end actuators;

d) Engaging the positive coupling of the synchronized gear when a rotational speed of the EMG and the shaft connected to the end actuators are synchronized.

2. A drive train system according to claim 1, wherein the wherein the Main Clutch is a positive engaging clutch.

3. A drive train according to claim 1, wherein the mechanical transmission comprises a split gearing and a range gear wherein at least one of the split gearing and the range gear comprises a synchronization arrangement.

4. An Electronic Control Unit for control of a drive train system for a hybrid vehicle, the drive train system comprising an Internal Combustion Engine (ICE), an Electric Motor/Generator (EMG), the ICE being located upstream of the EMG in the drive train system, a Main Clutch (MC) connecting the ICE to the EMG, a mechanical transmission including at least one synchronized gear with a positive coupling, the mechanical transmission being located downstream of the EMG and upstream of end actuators, and the Electronic Control Unit (ECU) wherein the Electronic Control Unit (ECU) is programmed to perform a control sequence comprising:

a) Setting, the drive train system in a generating mode when the vehicle is at standstill with its ICE running and a signal is provided to the ECU indicating that electric generation is desired, the generating mode including setting the MC to be engaged so that the EMG rotates in a generating mode and decoupling the end actuators by setting the mechanical transmission in neutral mode by disengaging a synchronization arrangement of the at least one synchronized gear;

b) Preparing a control sequence for a change of driving mode from idle to driving in response to a signal to the ECU indicating that motion of the vehicle is desired;

c) Disengaging the MC so that the ICE and EMG are disengaged from each other and engaging the synchronization arrangement of the at least one synchronized gear and thereby transmitting a torque from the EMG and associated rotating axles to the end actuators while the EMG slows down due to the engagement with the mechanical transmission and the end actuators;

d) Engaging the positive coupling of the synchronized gear when a rotational speed of the EMG and the shaft connected to the end actuators are synchronized.

5. A method for control of a drive train system of a vehicle, the drive train system comprising an Internal Combustion Engine (ICE), an Electric Motor/Generator (EMG), the ICE being located upstream of the EMG in the drive train system, a Main Clutch (MC) connecting the ICE to the EMG, a mechanical transmission including at least one synchronized gear, the mechanical transmission being located downstream of the EMG and upstream of end actuators, and an Electronic Control Unit (ECU) for control of the drive train system, the method for control of the drive train system comprising the steps of:

a) Setting the drive train system in a generating mode when the vehicle is at standstill with its ICE running and a signal is provided to the ECU indicating that electric generation is desired, the generating mode including setting the MC to be engaged so that the EMG rotates in a generating mode and decoupling the end actuators by setting the mechanical transmission in neutral mode by disengaging a synchronization arrangement of the at least one synchronized gear;

b) Preparing a control sequence for a change of driving mode from idle to driving in response to a signal to the ECU indicating that frail motion of the vehicle is desired;

c) Disengaging the MC so that the ICE and EMG are disengaged from each other and engaging the synchronization arrangement of the at least one synchronized gear and thereby transmitting a torque from the EMG and associated rotating axles to the end actuators while the EMG slows down due to the engagement with the mechanical transmission and the end actuators;

d) Engaging the positive coupling of the synchronized gear when a rotational speed of the EMG and the shaft connected to the end actuators are synchronized.

6. A computer program product comprising program code stored on a non-transitory computer readable medium for performing the steps of claim 5 when the program product is run on a computer.

7. A storage medium for use in a computing environment, the medium comprising a memory comprising a computer readable program code to perform the method of claim 5.

* * * * *